United States Patent [19]

Hattori et al.

[11] 4,100,895
[45] Jul. 18, 1978

[54] ELECTRONIC IGNITION TIMING CONTROL SYSTEM FOR AN INTERNAL COMBUSTION ENGINE

[75] Inventors: Tadashi Hattori; Minoru Nishida; Yoshiki Ueno, all of Okazaki, Japan

[73] Assignee: Nippon Soken, Inc., Nishio, Japan

[21] Appl. No.: 730,594

[22] Filed: Oct. 7, 1976

[30] Foreign Application Priority Data

Oct. 13, 1975 [JP] Japan .............................. 50-123662

[51] Int. Cl.² .............................................. F02P 5/00
[52] U.S. Cl. .............................................. 123/117 R
[58] Field of Search .......... 123/117 R, 32 EA, 117 D

[56] References Cited

U.S. PATENT DOCUMENTS

| 3,521,611 | 7/1970 | Finch | 123/117 R |
| 3,705,573 | 12/1972 | Palazzetti et al. | 123/117 R |
| 3,718,126 | 2/1973 | Oishi et al. | 123/117 R |
| 3,800,757 | 4/1974 | Finch | 123/117 R |
| 3,888,220 | 6/1975 | Bigalke et al. | 123/117 R |
| 3,890,944 | 6/1975 | Werner et al. | 123/117 D |

FOREIGN PATENT DOCUMENTS

| 2,221,503 | 11/1973 | Fed. Rep. of Germany ... | 123/117 R |
| 1,428,837 | 3/1976 | United Kingdom ............ | 123/117 R |

*Primary Examiner*—Ronald H. Lazarus
*Assistant Examiner*—Andrew M. Dolinar
*Attorney, Agent, or Firm*—Cushman, Darby & Cushman

[57] ABSTRACT

An electronic ignition timing control system for an internal combustion engine comprises a plurality of computing circuits each thereof including a capacitor. The capacitor of each computing circuit is charged and discharged in accordance with at least one operating parameter of the engine so as to compute an individual spark advance angle and the ignition timing of the engine is controlled in accordance with the sum of the computed outputs of the computing circuits.

10 Claims, 9 Drawing Figures

ELECTRONIC IGNITION TIMING CONTROL SYSTEM FOR AN INTERNAL COMBUSTION ENGINE

FIELD OF THE INVENTION

The present invention relates to electronic ignition timing control systems for internal combustion engines and, more particularly, the invention relates to an electronic ignition timing control system for an internal combustion engine comprising a plurality of computing circuits each including a capacitor, wherein the capacitor of each computing circuit is charged and discharged in accordance with at least one operating parameter of the engine to compute an individual spark advance and the ignition timing of the engine is controlled in accordance with the sum of the computed outputs of the computing circuits.

DESCRIPTION OF THE PRIOR ART

Figure 1:
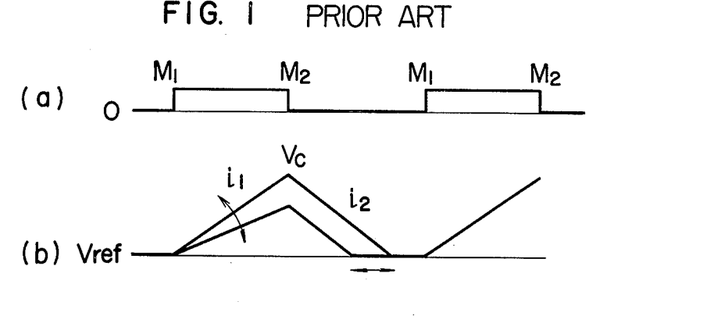
FIG. 1 is a time chart which is useful for explaining the operation of a conventional system.

Heretofore, apparatus for electronically controlling the ignition timing of an internal combustion engine is known in the art in which as shown in FIG. 1, the charging of a capacitor is started at a reference angular position $M_1$ for each cylinder of the engine and the discharging of the capacitor is started at another angular position $M_2$, thus selecting the point at which the discharging is terminated as the desired point of ignition. In this case, assuming that $i_1$ represents the charging current and $i_2$ represents the discharging current, then the ignition timing can be controlled to suit the operating conditions of the engine by fixing the discharging current $i_2$ and varying the charging current $i_1$ in accordance with the engine operating conditions.

While this type of conventional system has many advantages, there is the following disadvantage. Namely, in the above-mentioned conventional system, when the charging current is changed in accordance with various engine parameters, the terminal voltage $V_c$ of the capacitor changes over the entire range of the engine conditions with change in the charging current $i_1$. Consequently, if the range of the engine conditions is considerably wide, namely, the control range of the ignition is wide, the terminal voltage $V_c$ changes considerably and thus accuracy of the ignition timing is deteriorated considerably, particularly at high speeds of the engine. There exists another disadvantage that since the several engine parameters are detected and the required spark advance characteristic of the engine is obtained in relation to the detected parameters, it is necessary to produce an engine parameters-current characteristic of the capacitor in the form of a complicated curve, e.g., a nonlinear curve with the resulting complication of the circuit construction, and in particular where the interaction weighting is required between the two or more engine parameters the resulting circuit construction is extremely complicated.

SUMMARY OF THE INVENTION

With a view to overcoming the foregoing difficulty, it is an object of the invention to provide an electronic ignition timing control system for an internal combustion engine wherein the ignition timing of the engine is controlled in accordance with the sum of a plurality of computations made utilizing a plurality of capacitors.

It is another object of the invention to provide an electronic ignition timing control system for an internal combustion engine wherein the computation of the ignition timing is accomplished with greater accuracy, particularly at high engine rotational speeds.

It is still another object of the invention to provide an electronic ignition timing control system for an internal combustion engine which is capable of computing the ignition timing to well suit the requirements of the engine with a simple circuit construction.

The gist of this invention will now be described with reference to the time chart of FIG. 2.

Figure 2:
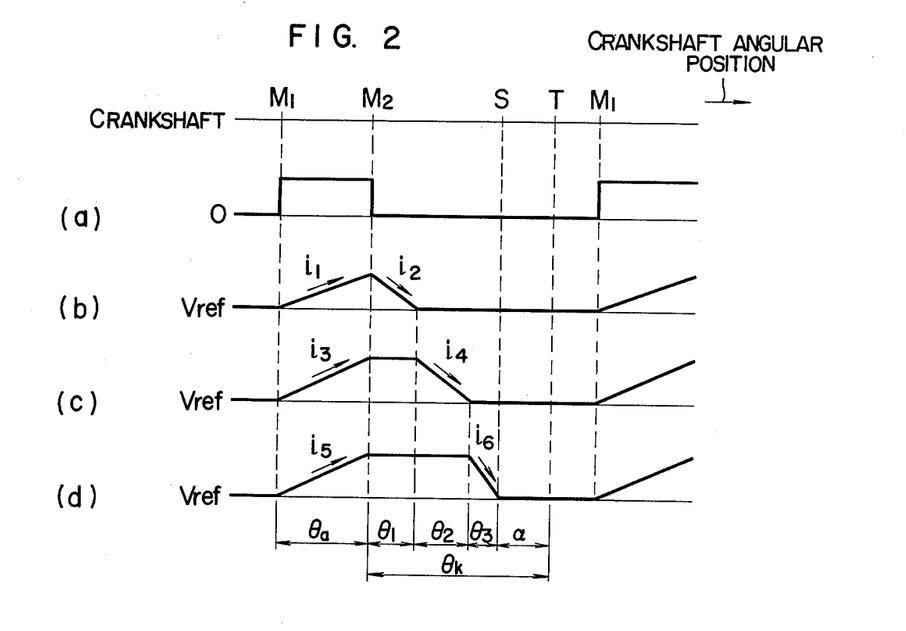
FIG. 2 is a time chart which is useful for explaining the operation of a system according to the invention.

Angular positions $M_1$ and $M_2$ of the crankshaft are detected for each cylinder so that in a first computing circuit, as shown in (b) of FIG. 2, the charging of its capacitor is started at the time of $M_1$ with a charging current $i_1$ and the charging is terminated at the time of $M_2$ simultaneously causing the capacitor to discharge with a discharge current $i_2$. Similarly, as shown in (c) of FIG. 2, in a second computing circuit the charging of its capacitor is started at $M_1$ with a charging current $i_3$ and the charging is terminated at $M_2$ to maintain the resulting terminal voltage of the capacitor which in turn is caused to start discharging with a discharge current $i_4$ at the time that the discharging of the capacitor in the first computing circuit is terminated. In this way, the charging of the capacitor in each of the computing circuits is effected during the same time period $M_1$ to $M_2$ and the resulting capacitor potential in the second computing circuit et seq. is maintained until it is caused to start discharging upon termination of the discharging of the capacitor in the preceding computing circuit. Thus, the point at which the discharging of the capacitor in the final computing circuit is terminated, is selected as the desired ignition timing.

In this case, assuming that $\theta_a$ represents the angle from $M_1$ to $M_2$, $\theta_1$, $\theta_2$, $\theta_3$, --- represent respectively the angles during which the capacitors in the respective computing circuits discharge, T represents the top dead center at the end of the compression stroke of each cylinder, S represents the ignition point, $\theta_K$ represents the angle from $M_2$ to T, and $\alpha$ represents the angle from S to T or the spark advance angle, then the following relation holds. Namely, since $i_1\theta_a = i_2\theta_1$, $i_3\theta_a = i_4\theta_2$ and $i_5\theta_a = i_6\theta_3$ from FIG. 2, we obtain $$\alpha = \theta_K - (\theta_1 + \theta_2 + \theta_3 + \text{-----}) = \theta_K - (i_1/i_2 + i_3/i_4 + l\,i_5/i_6 + \text{-----})\cdot\theta_a \quad (1)$$

Since $\theta_K$ is fixed, the spark advance angle $\alpha$ is given by the sum of the characteristics of the computing circuits and consequently the ignition timing can be changed by relating the charging and discharging currents of the capacitors in the computing circuits to the parameters of the engine. In this case, since the engine parameters are distributed among the computing circuits, the degree of variation of the voltage across the capacitor in each computing circuit is reduced as compared with that in the conventional system and the accuracy of ignition timing control at high rotational speeds of the engine is improved. Further, by using any of the various arrangements in which the charging current of the capacitor in each computing circuit is fixed but the discharging current is changed in accordance with an engine parameter, the discharging current is fixed but the charging current is changed in accordance with an engine parameter, both the charging and discharging currents are changed in accordance with engine parameters, etc., even if a simple engine parameter-current (or voltage) characteristic (e.g., a linear characteristic) is used for the capacitor in each computing circuit, a spark advance characteristic resulting from the combination of the outputs of the computing circuits may be designed to have a complicated characteristic curve which exactly meets the requirement of the engine.

DESCRIPTION OF THE PREFERRED EMBODIMENT

Figure 3:
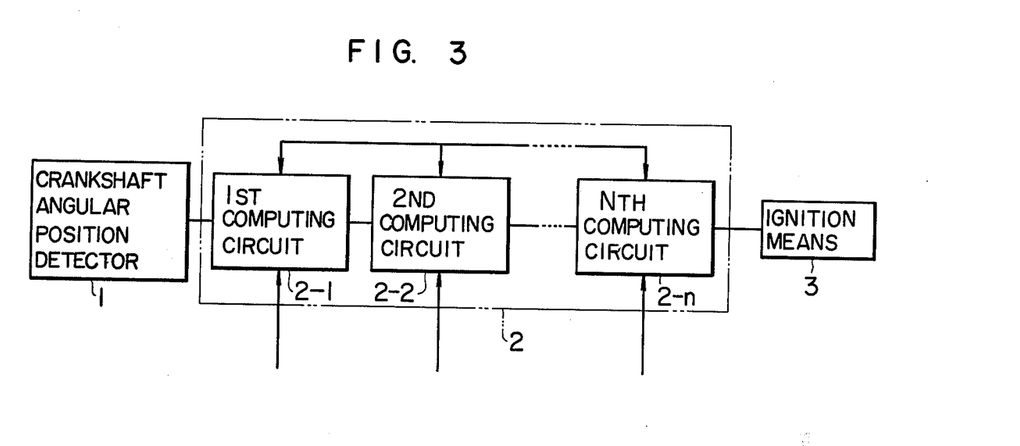
FIG. 3 is a block diagram showing an embodiment of the system according to the invention.

The present invention will now be described in greater detail with reference to the illustrated embodiment. In FIG. 3 showing a block diagram of the system according to the invention, numeral 1 designates a crankshaft angular position detector for detecting two different angular positions of the crankshaft of a four-cylinder four-cycle internal combustion engine, 2 an ignition timing computing circuit including first, second, -----, and n-th computing circuits 2-1, 2-2, -----, and 2-n which are responsive to the signals from the crankshaft angular position detector 1 to start the charging and discharging of their capacitors and thereby compute the required spark advance angle, namely, in response to engine parameters detected by engine condition sensors which are not shown the capacitor charging and discharging currents of the computing circuits 2-1, 2-2, -----, and 2-n are changed to control the ignition timing in accordance with the engine parameters. Numeral 3 designates ignition means responsive to the signal from the ignition timing computing circuit 2 to produce ignition sparks.

Figure 4:
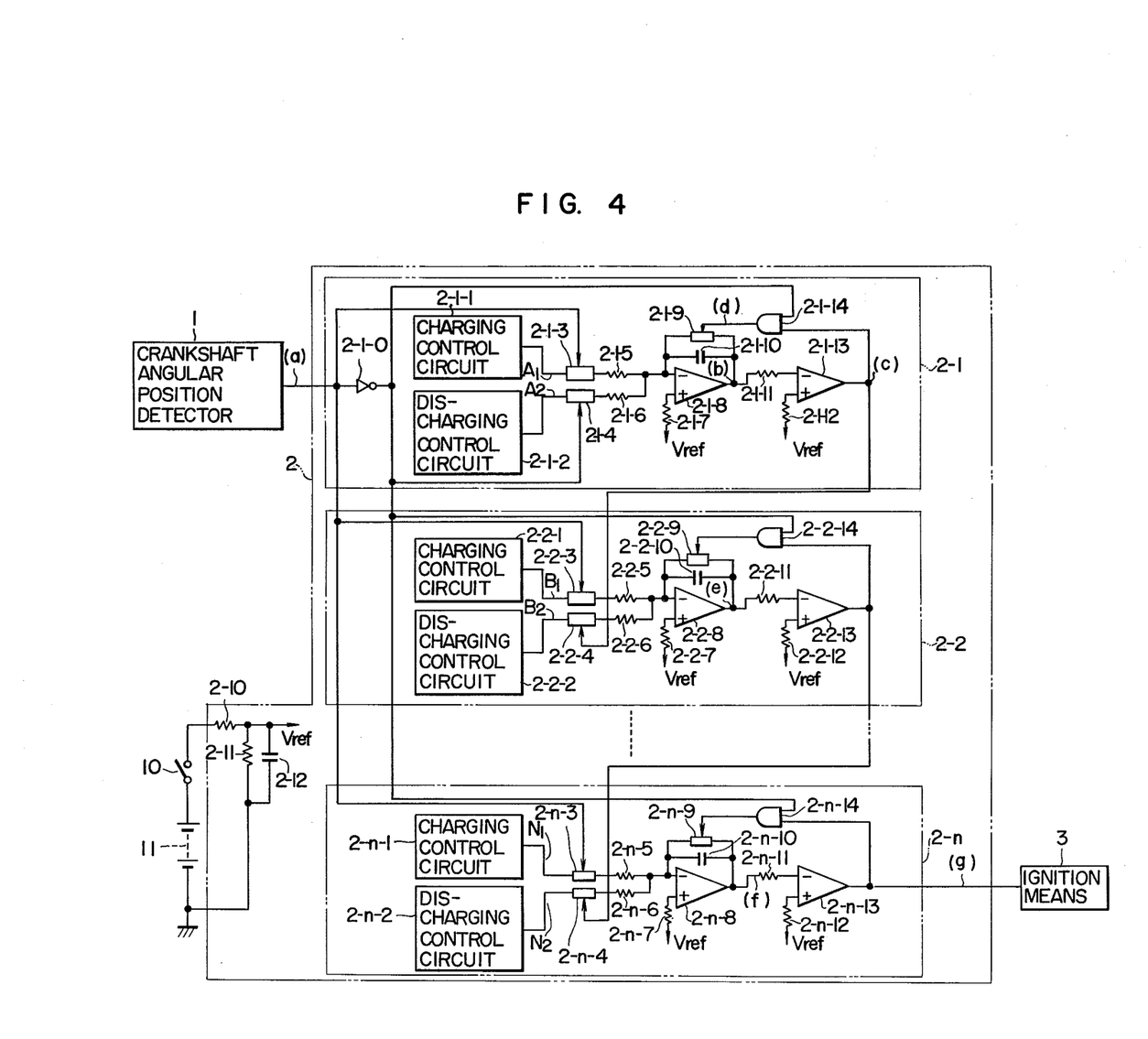
FIG. 4 is a wiring diagram showing a detailed circuit construction of the system of the invention shown in FIG. 3.

Next, a detailed circuitry of the system according to the invention will be described with reference to FIG. 4. In the ignition timing computing circuit 2, a reference potential $V_{ref}$ is produced by resistors 2-10 and 2-11 and a capacitor 2-12 and it is coupled through bias resistors to operational amplifiers which will be described hereinafter. The first computing circuit 2-1 comprises a NOT circuit 2-1-0, a charging control circuit 2-1-1, a discharging control circuit 2-1-2, analog switches 2-1-3, 2-1-4 and 2-1-9 adapted to be turned on in response to a "1" level signal, a charge resistor 2-1-5, a discharge resistor 2-1-6, bias resistors 2-1-7 and 2-1-12 to which is coupled the reference potential $V_{ref}$, an input resistor 2-1-11, differential amplifiers 2-1-8 and 2-1-13, a capacitor 2-1-10 and an AND circuit 2-1-14. The resistors 2-1-5, 2-1-6 and 2-1-7, the capacitor 2-1-10 and the differential amplifier 2-1-8 constitute a Miller integrator circuit wherein the capacitor 2-1-10 is charged when the input voltage is lower than the reference potential $V_{ref}$ whereas the capacitor 2-1-10 is discharged when the input voltage is higher than the reference potential $V_{ref}$. The resistors 2-1-11 and 2-1-12 and the differential amplifier 2-1-13 constitute a comparison circuit. Similarly with the first computing circuit 2-1, the second computing circuit 2-2 comprises a charging control circuit 2-2-1, a discharging control circuit 2-2-2, analog switches 2-2-3, 2-2-4 and 2-2-9 adapted to be turned on in response to a "1" level signal, a charge resistor 2-2-5, a discharge resistor 2-2-6, bias resistors 2-2-7 and 2-2-12 to which is coupled the reference potential $V_{ref}$, an input resistor 2-2-11, differential amplifiers 2-2-8 and 2-2-13, a capacitor 2-2-10 and an AND circuit 2-2-14. Also similarly, the n-th computing circuit 2-n comprises a charging control circuit 2-n-1, a discharging control circuit 2-n-2, analog switches 2-n-3, 2-n-4 and 2-n-9 adapted to be turned on in response to a "1" level signal, a charge resistor 2-n-5, a discharge resistor 2-n-6, bias resistors 2-n-7 and 2-n-12 to which is coupled the reference potential $V_{ref}$, an input resistor 2-n-11, differential amplifiers 2-n-8 and 2-n-13, a capacitor 2-n-10 and an AND circuit 2-n-14. Each of the analog switches 2-1-3, 2-1-4, 2-1-9, 2-2-3, 2-2-4, 2-2-9, 2-n-3, 2-n-4 and 2-n-9 may advantageously be comprised of a field-effect transistor. Numeral 10 designates a key switch, 11 a battery constituting a power source.

An embodiment of the detailed circuitry of the crankshaft angular position detector 1 and the charging and discharging control circuits of the respective computing circuits will now be described with reference to FIG. 6. In this embodiment, the particular engine parameters used include the engine rotational speed, the pressure within the intake manifold (the pressure is hereinafter represented by the intake manifold vacuum) and cooling water temperature. In the crankshaft angular position detector 1, numeral 1-1 designates a rotor having four projections arranged at equal intervals on its outer periphery and it is fixedly mounted on the distributor shaft of the engine which is not shown for rotation therewith. Numerals 1-2 and 1-3 designate first and second electromagnetic pickups which are displaced from each other by a predetermined angle in the circumferential direction of the rotor 1-1 and arranged to oppose the projections on the rotor 1-1. Numerals 1-6 and 1-7 designate transistors respectively connected to the electromagnetic pickups 1-2 and 1-3, 1-4 and 1-5 resistors. Numerals 1-8 and 1-9 designate NAND circuits constituting a flip-flop circuit having its one input connected to the collector of the transistor 1-6 and its other input connected to the collector of the transistor 1-7. The rotor 1-1 rotates once in the direction of the arrow for every two revolutions of the crankshaft, so that when each of the projections on the rotor 1-1 passes the electromagnetic pickups 1-2 and 1-3, respectively, the electromagnetic pickups 1-2 and 1-3 produce respectively a signal which goes from a positive to negative value. Consequently, the electromagnetic pickups 1-2 and 1-3 detect angular positions $M_1$ and $M_2$ of the crankshaft for each cylinder of the engine. In response to the generation of the negative signals from the electromagnetic pickups 1-2 and 1-3, the transistors 1-6 and 1-7 are turned on and the turning on of the transistors 1-6 and 1-7 brings the flip-flop circuit comprising the NAND circuits 1-8 and 1-9 into operation, thus producing the output shown in (a) of FIG. 5 and corresponding to the rotational speed of the engine. The charging control circuit 2-1-1 of the first computing circuit 2-1 comprises resistors 2-1-1-1 and 2-1-1-2 and it is designed so that due to the voltage division by the resistors its output $A_1$ assumes a fixed voltage value which is lower than the reference potential $V_{ref}$. The discharging control circuit 2-1-2 is connected to the crankshaft angular position detector 1 and it comprises capacitors 2-1-2-1 and 2-1-2-5, resistors 2-1-2-2, 2-1-2-4, 2-1-2-6, 2-1-2-9 and 2-1-2-10, a transistor 2-1-2-3, a Zener diode 2-1-2-7 and a diode 2-1-2-8, and the differentiated pulse produced by the capacitor 2-1-2-1 and the resistor 2-1-2-2 is integrated by the capacitor 2-1-2-5. While the transistor 2-1-2-3 is turned on only for the duration of the time width of the differentiated pulse from the time that the output pulse of the crankshaft angular position detector 1 shown in (a) of FIG. 5 goes from the "1" to "0" level or the time of the angular position $M_2$ and thus the potential across the capacitor 2-1-2-5 substantially increases linearly with increase in the engine rotational speed, the potential at higher rotational speeds is limited to a predetermined voltage value by the Zener diode 2-1-2-7 and the potential at lower rotational speeds is also limited to a predetermined value by the divided potential of the dividing resistors 2-1-2-9 and 2-1-2-10. Thus, the output potential $A_2$ of the discharging control circuit 2-1-2 changes as shown in (a) of FIG. 7 in accordance with the engine rotational speed n. In this case, the output potential $A_2$ is always maintained higher than the reference potential $V_{ref}$. On the other hand, a pressure sensor 20 which is mounted in the intake manifold of the engine for sensing the intake manifold vacuum, comprises strain gage resistors 21, 22, 23 and 24 constituting a bridge whose potential difference changes in response to changes in the intake vacuum. The charging control circuit 2-2-1 of the second computing circuit 2-2 is connected to the pressure sensor 20 and it comprises input resistors 2-2-1-1 and 2-2-1-2, a feedback resistor 2-2-1-3, a differential amplifier 2-2-1-4, a resistor 2-2-1-5, a Zener diode 2-2-1-6, a diode 2-2-1-7 and dividing resistors 2-2-1-8 and 2-2-1-9, and the output potential $B_1$ of the charging control circuit 2-2-1 changes in accordance with the intake manifold vacuum P as shown in (b) of FIG. 8 since, while the output potential $B_1$ increases as the intake manifold vacuum increases, the output potential $B_1$ at higher vacuums is limited to a predetermined value by the Zener diode 2-2-1-6 and the output potential $B_1$ at lower vacuums is also limited to a predetermined value by the divided potential determined by the dividing resistors 2-2-1-8 and 2-2-1-9. The charging control circuit 2-2-1 is designed so that its output potential $B_1$ is always lower than the reference potential $V_{ref}$. The discharging control circuit 2-2-2 comprises resistors 2-2-2-1 and 2-2-2-2 and its output potential $B_2$ is always kept at a predetermined value which is higher than the reference potential $V_{ref}$. On the other hand, a water temperature sensor consists of a temperature sensor 30 of the type having contacts which are closed in response to water temperatures lower than a predetermined value and which are opened in response to temperatures higher than the predetermined value. The temperature sensor 30 is mounted in the engine cooling water passage and it is also connected to a charging control circuit 2-3-1 of the third computing circuit. The charging control circuit 2-3-1 comprises resistors 2-3-1-1, 2-3-1-2 and 2-3-1-3 so that since the temperature sensor 30 is closed when the cooling water temperature is lower than the preset value, its output potential $N_1$ is held at the divided potention by the resistor 2-3-1-1 and the resistors 2-3-1-2 and 2-3-1-3 which are connected in parallel with each other, whereas when the cooling water temperature exceeds the preset value so that the temperature sensor 30 is opened, the output potential $N_1$ is held at the divided voltage determined only by the resistors 2-3-1-1 and 2-3-1-2. Thus, the output potential $N_1$ of the charging control circuit 2-3-1 changes in accordance with the cooling water temperature T as shown in (a) of FIG. 9. In this case, the output potential $N_1$ is held lower than the reference potential $V_{ref}$. The discharging control circuit 2-3-2 comprises resistors 2-3-2-1 and 2-3-2-2 and its output potential $N_2$ is held at a preset divided potential which is higher than the reference potential $V_{ref}$.

Figure 7:
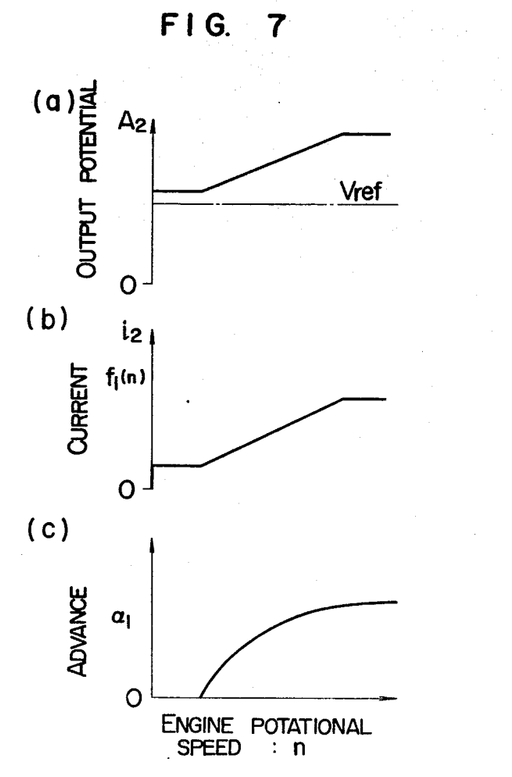
FIGS. 7, 8 and 9 each shows output voltage, current and spark advance characteristic diagrams which are useful in explaining the operation of the system shown in FIG. 6.
Figure 8:
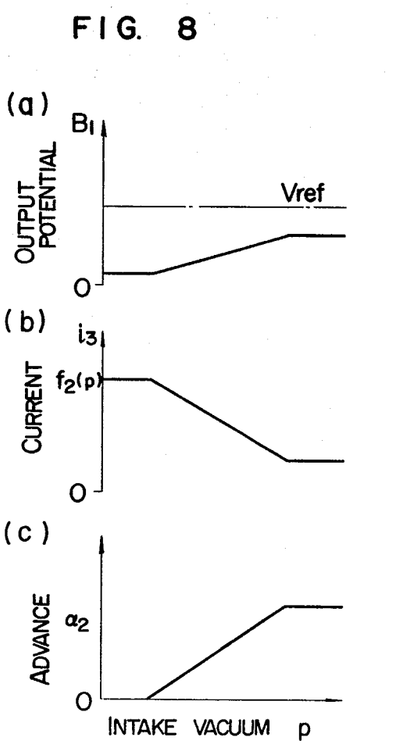
Figure 9:
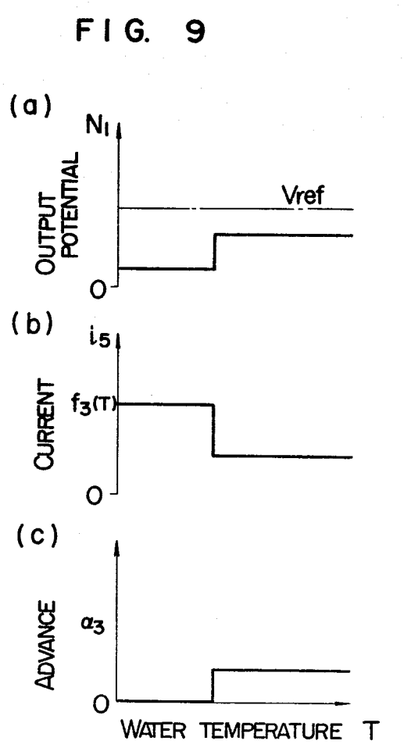

With the construction described above, the operation of the system of this invention will now be described with reference to the signal waveform diagram of FIG. 5 and the characteristic diagrams of FIGS. 7, 8 and 9. The crankshaft angular position detector 1 produces rectangular pulses in synchronism with the rotation of the engine crankshaft which is not shown, so that its output goes to the "1" level during a time period $M_1$ to $M_2$ and to the "0" level during a time period $M_2$ to $M_1$ as shown in (a) of FIG. 5 and the output consists of two pulses, two periods, per revolution of the engine. When the output of the crankshaft angular position detector 1 goes to the "1" level, the analog switch 2-1-3 of the first computing circuit 2-1 is turned on. Since the output of the NOT circuit 2-1-0 is at the "0" level at this time, the analog switch 2-1-4 is turned off so that since the output signal (d) of the AND circuit 2-1-14 is at the "0" level as shown in (d) of FIG. 5 and the capacitor resetting analog switch 2-1-9 is off, as shown in (b) of FIG. 5, the capacitor 2-1-10 is charged by the charging control circuit 2-1-1 from the reference potential $V_{ref}$ starting at the time of $M_1$. In response to the charging of the capacitor 2-1-10, the output (b) of the differential amplifier 2-1-8 becomes higher than the reference potential $V_{ref}$ and consequently the output (c) of the comparison circuit goes to the "0" level as shown in (c) of FIG. 5.

Figure 5:
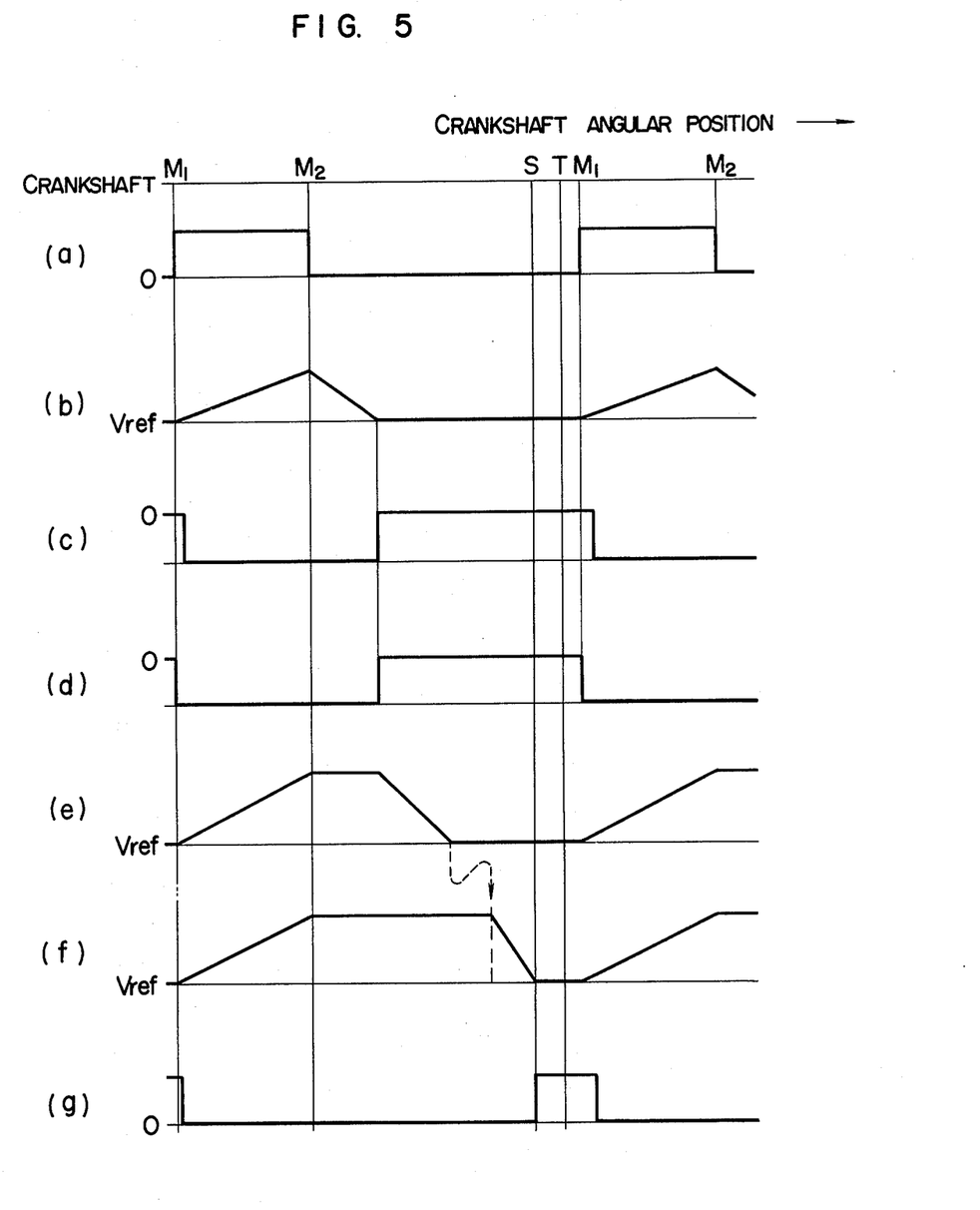
FIG. 5 is a signal waveform diagram useful in explaining the operation of the system of the invention.
Figure 6:
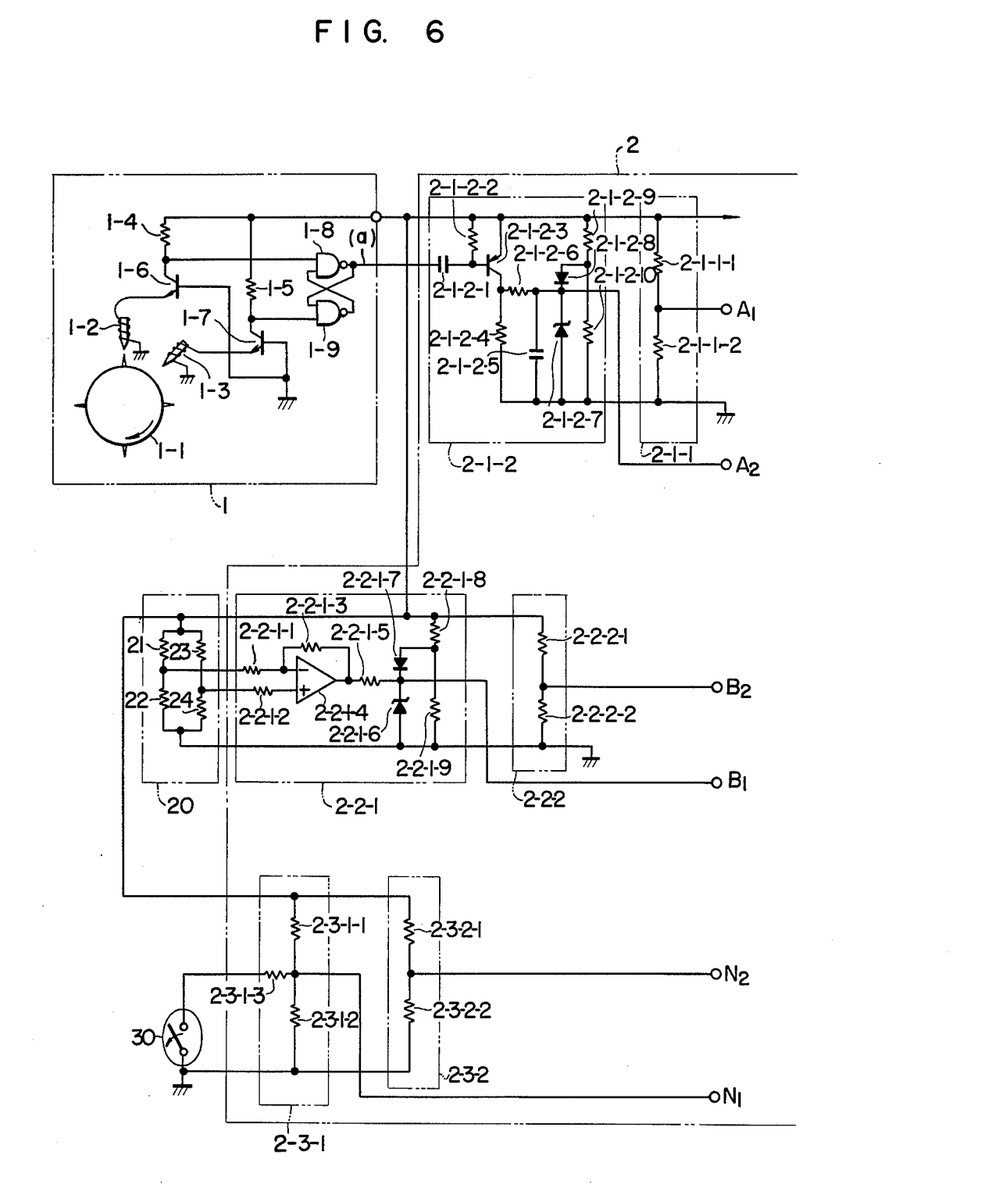
FIG. 6 is a wiring diagram showing in greater detail an embodiment of the crankshaft angular position detector and the principal parts of the computing circuits used in the system of the invention shown in FIG. 4.

Thereafter, when the output signal (a) of the crankshaft angular position detector 1 goes to the "0" level at the time of $M_2$, the analog switch 2-1-3 is turned off and simultaneously the analog switch 2-1-4 is turned on, thus causing the capacitor 2-1-10 by the discharging control circuit 2-1-2 to start discharging as shown in (b) of FIG. 5. When the discharging of the capacitor 2-1-10 is completed so that the output (b) of the differential amplifier 2-1-8 becomes lower than the reference potential $V_{ref}$, the output (c) of the comparison circuit goes from the "0" to "1" level as shown in (c) of FIG. 5 and the output (d) of the AND circuit 2-1-14 goes to the "1" level as shown in (d) of FIG. 5, thus turning on the analog switch 2-1-9 and thereby maintaining the output (b) of the differential amplifier 2-1-8 at the reference potential $V_{ref}$ as shown in (b) of FIG. 5.

The second computing circuit 2-2 operates as follows. While the second computing circuit 2-2 is practically the same in construction with the first computing circuit 2-1, the input signal to the analog switch 2-2-4 is the output (c) of the first computing circuit 2-1 so that the capacitor 2-2-10 is charged by the charging control circuit 2-2-1 during the time period $M_1$ to $M_2$ as shown in (e) of FIG. 5 and the analog switch 2-2-3 is turned off at the time of $M_2$. Since the analog switches 2-2-4 and 2-2-9 are also off at this time, the output (e) of the differential amplifier 2-2-8 maintains the potential attained at the time of $M_2$ as shown in (e) of FIG. 5. Then, when the output (c) of the first computing circuit 2-1 goes to the "1" level as shown in (c) of FIG. 5 so that the analog switch 2-2-4 is turned on, the capacitor 2-2-10 is caused by the discharging control circuit 2-2-2 to start discharging and upon termination of the discharging the output of the second computing circuit 2-2 goes from the "0" to "1" level in the similar manner as the first computing circuit 2-1. The third, fourth, ---, and the n-th computing circuits operate in the similar manner. Thus, in the final n-th computing circuit 2-n, the output (f) of the differential amplifier 2-n-8 has a waveform as shown in (f) of FIG. 5 and the output (g) of the n-th computing circuit 2-n which goes to the "1" level upon termination of the discharging as shown in (g) of FIG. 5 is applied to the ignition means 3 causing it to produce an ignition spark at the point that the output signal (g) goes to the "1" level. The above-described operation is carried out repeatedly. In the case of an arrangement including three computing circuits, the third computing circuit corresponds to the n-th computing circuit so that when the output of the second computing circuit 2-2 goes to the "1" level, the analog switch 2-n-4 is turned on and the discharging control circuit 2-n-2 causes the capacitor 2-n-10 to start discharging, thus selecting the termination point of the discharging of the capacitor 2-n-1 as the desired ignition point.

Next, the operation of the first, second and third computing circuits with their respective charging and discharging control circuits constructed according to the embodiment of FIG. 6 will be described with reference to the time chart of FIG. 2 and the equation (1).

In the first computing circuit 2-1, the output $A_1$ of the charging control circuit 2-1-1 is fixed and thus the charging current $i_1$ is also fixed ($i_1 = K_1$). On the other hand, since the output $A_2$ of the discharging control circuit 2-1-2 varies in accordance with the engine rotational speed $n$ as shown in (a) of FIG. 7, the discharging circuit $i_2$ similarly varies as shown in (b) of FIG. 7 and thus it can be given as a function of $n$ written $i_2 = f_1(n)$. In the second computing circuit 2-2, the output $B_1$ of the charging control circuit 2-2-1 varies in accordance with the intake manifold vacuum as shown in (a) of FIG. 8 and thus the charging current $i_3$ varies as shown in (b) of FIG. 8. Thus, the charging current $i_3$ is given as $i_3 = f_2(P)$ and the charging current $i_3$ decreases as the intake manifold vacuum P increases. The output $B_2$ of the discharging control circuit 2-2-2 is fixed and thus the discharging current $i_4$ is given as $i_4 = 1/K_2$ ($K_2$ is fixed). In the third computing circuit 2-3, the output $N_1$ of the charging control circuit 2-3-1 varies as shown in (a) of FIG. 9 and the charging current $i_5$ varies as shown in (b) of FIG. 9. Thus, it is given as $i_5 = f_3(T)$. Since the output $N_2$ of the discharging control circuit 2-3-2 has a constant potential, the discharging current $i_6$ is given as $i_6 = 1/K_3$ ($K_3$ is fixed). Consequently, the spark advance angle $\alpha$ is given as follows from the equation (1)

$$\alpha = \theta_K - (K/f_1(n)) + K_2 f_2(P) + K_3 f_3(T))\theta_a \quad (2)$$

In other words, the advance angle $\alpha$ is determined by the sum of the computations of the computing circuits 2-1, 2-2 and 2-3. Thus, the engine parameter spark advance characteristics of the computing circuits 2-1, 2-2 and 2-3 are given in (c) of FIGS. 7, 8 and 9, respectively, and the advance angle $\alpha$ is given as the sum of the three spark advance characteristics $\alpha_1$, $\alpha_2$ and $\alpha_3$. It is to be noted that in this embodiment the charging current $i_2$ of the first computing circuit 2-1 is varied in accordance with the engine rotational speed $n$ and thus the engine rotational speed ($n$) spark advance characteristic is given in the form of a reciprocal function.

While, in the above-described embodiment, each of the computing circuits is associated with selected one of the engine parameters, each of the computing circuits may be associated with two or more parameters. For example, by giving the charging current of the first computing circuit 2-1 as a function of the intake manifold vacuum written $i_1 = f_1(P)$, its discharging current as a function of the engine rotational speed written $i_2 = f_2(n)$, the charging current of the second computing circuit 2-2 as a function of the cooling water temperature (T), engine oil temperature ($T_2$) and engine acceleration (a) written $i_3 = f_3(T) + f_4(T_2) + f_5(a)$ and its discharging current as a constant current written $i_4 = 1/K$, then we obtain $$\alpha = (f_1(P))/(f_2(n)) + K \cdot (f_3(T) + f_4(T_2) + f_5(a)) \quad (3)$$

Thus, the spark advance by the first computing circuit 2-1 is determined by the interaction between the intake manifold vacuum and the engine rotational speed and the spark advance by the second computing circuit 2-2 is given in terms of the sum of the three engine parameters.

Further, while, in the above-described embodiment, the crankshaft angular position detector 1 uses electromagnetic pickups to detect the angular positions of the crankshaft, the similar effects may be obtained with a detector of the photoelectric type or contact point type.

We claim:

1. An electronic ignition timing control system for electronically controlling the ignition timing of an internal combustion engine having a crankshaft and having associated therewith ignition means responsive to an ignition signal applied thereto for effecting said ignition, said timing control system comprising:

crankshaft angular position detecting means responsive to the angular position of said crankshaft for producing detection output pulses indicative of a period during which the crankshaft rotates between first and second predetermined angular positions; and an ignition timing computing circuit including a plurality of individual computing circuits each thereof having:

an integration capacitor;

means responsive to said detection output pulses for selectively charging said capacitor during said period;

a charging and discharging control circuit connected to said capacitor and responsive to first and second control signals applied thereto, said first control signal being indicative of an engine parameter, said control circuit including means for selectively initiating discharge of said capacitor in accordance with said second control signal and, means for varying at least one of the charging and discharging currents of said capacitor in accordance with said engine parameter;

a capacitor voltage detecting circuit connected to said capacitor and responsive to the voltage across said capacitor for generating a discharge termination output signal indicative of said capacitor being discharged to a predetermined value; and said respective individual computing circuits being connected in a predetermined sequence, the discharge termination output signal of the just previous individual computing circuit in said sequence being applied as said control circuit second control signal to the next successive individual computing circuit in said sequence, said detection output pulses being applied to the first computing circuit in said sequence as said control circuit second control signal, and said discharge termination output signal of the last individual computing circuit in said sequence being applied as said ignition signal to said ignition means.

2. A system according to claim 1, wherein each of said plurality of computing circuits in said ignition timing computing circuit further includes charging switch means and discharging switch means connected between said capacitor and said charging and discharging control circuit, for respectively passing said charging and discharging currents in response to the output signals of said angular position detecting means and said capacitor voltage detecting circuit.

3. A system according to claim 1, wherein the charging and discharging control circuit in at least one of said plurality of computing circuits includes a current variation circuit for varying the discharging current of said charging and discharging control circuit in accordance with said engine parameter.

4. A system according to claim 3, wherein said engine parameter utilized by said current variation circuit is the rotational speed of said engine.

5. A system according to claim 1, wherein each of said plurality of computing circuits further includes a circuit connected across said capacitor and responsive to the output signals of said capacitor voltage detecting circuit and said angular position detecting means for fully discharging said capacitor upon occurrence of said discharge termination output signal.

6. A system according to claim 1, wherein said angular position detecting means includes a rotor rotatable in synchronism with the rotation of said engine, and pickup means for physically detecting and converting the revolutions of said rotor into electric signals.

7. A system according to claim 2, wherein each of said plurality of computing circuits further includes a circuit connected across said capacitor and responsive to the output signals of said capacitor voltage detecting circuit and said angular position detecting means for fully discharging said capacitor upon occurrence of the discharge termination output signal.

8. A system according to claim 7, wherein the charging and discharging control circuit in at least one of said plurality of computing circuits further includes a current variation circuit for varying the discharging current of said charging and discharging control circuit in accordance with said engine parameter.

9. A method for electronically controlling ignition timings of an internal combustion engine comprising the steps of:

detecting predetermined first and second angular positions of an internal combustion engine;

integrating, in a plurality of first and second through n-th computing circuits, respective first input signals in one of increasing and decreasing directions from a predetermined reference value, said integrations in one direction being attained simultaneously from the detection of said first angular position to the detection of said second angular position;

integrating, in said first through n-th computing circuits, respective second input signals in the other of increasing and decreasing directions from respective final values indicative of respective results of said integrations in one direction to said predetermined reference value, said integrations in the other direction being attained in such a sequential manner that the integration in said first computing circuit is started in synchronization with the detection of said second angular position and the integrations in said second through n-th computing circuits are respectively started in synchronization with the completion of integration in the preceding computing circuit;

detecting a plurality of operating conditions of said combustion engine;

controlling at least either one of said first and second input signals applied to corresponding one of said computing circuits in accordance with one of detection values of said operating conditions; and producing an ignition spark at the timing synchronized with the completion of integration in the other direction in said n-th computing circuit.

10. A method for electronically controlling the ignition timing of an internal combustion engine having a crankshaft and having associated therewith ignition means responsive to an ignition signal applied thereto for effecting said ignition, comprising the steps of:

(a) generating a crankshaft position signal indicative of a period during which the crankshaft rotates between first and second predetermined angular positions;

(b) applying, responsive to said crankshaft position signal, a respective charging current to each of a plurality of integrating capacitors during said period;

(c) selectively discharging said capacitors in a predetermined sequence, the discharge of a given capacitor in said sequence being initiated responsive to the discharge of the just previous capacitor in said sequence to a respective predetermined level, the discharge of said first capacitor in said sequence being initiated responsive to said crankshaft position signal at the termination of said period;

(d) generating a signal indicative of the last capacitor in said sequence having been discharged to a respective predetermined level and applying said signal to said ignition means as said ignition signal; and (e) varying at least one of the charging and discharging currents of the respective capacitors in accordance with respective parameters of said engine.

* * * * *